US006873982B1

(12) United States Patent
Bates et al.

(10) Patent No.: US 6,873,982 B1
(45) Date of Patent: Mar. 29, 2005

(54) ORDERING OF DATABASE SEARCH RESULTS BASED ON USER FEEDBACK

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 09/356,241

(22) Filed: Jul. 16, 1999

(51) Int. Cl.$^7$ ............................................. G06F 17/30
(52) U.S. Cl. ...................... 707/5; 707/3; 707/7; 707/10
(58) Field of Search ........................ 707/1–7, 10, 513, 707/501, 201, 204

(56) References Cited

U.S. PATENT DOCUMENTS

| 5,724,567 A | * | 3/1998 | Rose et al. ..................... 707/5 |
| 5,748,954 A | | 5/1998 | Mauldin |
| 5,835,087 A | * | 11/1998 | Herz et al. .................. 345/419 |
| 5,855,015 A | * | 12/1998 | Shoham ......................... 707/5 |
| 5,864,679 A | * | 1/1999 | Kanai et al. ................. 707/201 |
| 6,085,186 A | * | 7/2000 | Christianson et al. .......... 707/3 |
| 6,088,707 A | * | 7/2000 | Bates et al. ................. 707/501 |
| 6,182,063 B1 | * | 1/2001 | Woods ........................... 707/3 |
| 6,324,566 B1 | * | 11/2001 | Himmel et al. ............. 709/203 |

OTHER PUBLICATIONS

Marko Balabanovic et al, Content–Based, Collaborative Recommendation Mar. 1997, Communications of the ACM, vol. 40, No. 3.*
"The Direct Hit Technology—A White Paper", http://www.directhit.com/whitepaper.html, downloaded Jun. 3, 1999, 5 pages.
"Personalized Search", http://www.directhit.com/personalized.html, downloaded Jun. 3, 1999, 1 page.
"Related Searches", http://www.directhit.com/related_searches.html, downloaded Jun. 3, 1999, 1 page.
"Counting Clicks and Looking at Links", http://searchenginewatch.internet.com/sereport/9808–clicks.html. downloaded Jun. 3, 1999, 5 pages.

* cited by examiner

Primary Examiner—Shahid Alam
Assistant Examiner—Cam Y Truong
(74) Attorney, Agent, or Firm—Wood, Herron & Evans, LLP

(57) ABSTRACT

An apparatus, program product, and method rely on user interaction in the ordering search results returned by a search engine. Each of a plurality of records in a database is associated with a user feedback parameter that is used in ordering the records identified in a result set generated in response to a search request. The user feedback parameter for a given record may be selectively updated in response to detecting multiple accesses thereto by a user and/or in response to detecting that the record is the most recently accessed record in the result set. In addition, the user feedback parameter for a given record may be configured with a plurality of weights that are respectively associated with particular keywords, such that ordering of the records in a result set can utilize only those weights that are associated with keywords that match a particular search request. Furthermore, a search request data structure may be utilized to store a plurality of search request records, each including a search request identifier identifying a unique combination of keywords, and a result set identifier identifying a subset of a plurality of records in a database that match the unique combination of keywords. The search request data structure may be accessed in response to a search request to locate a search request record including a search request identifier that matches the keywords provided in the search request, with a result set generated that identifies the subset of records identified in the result set identifier in the located search request record.

44 Claims, 8 Drawing Sheets

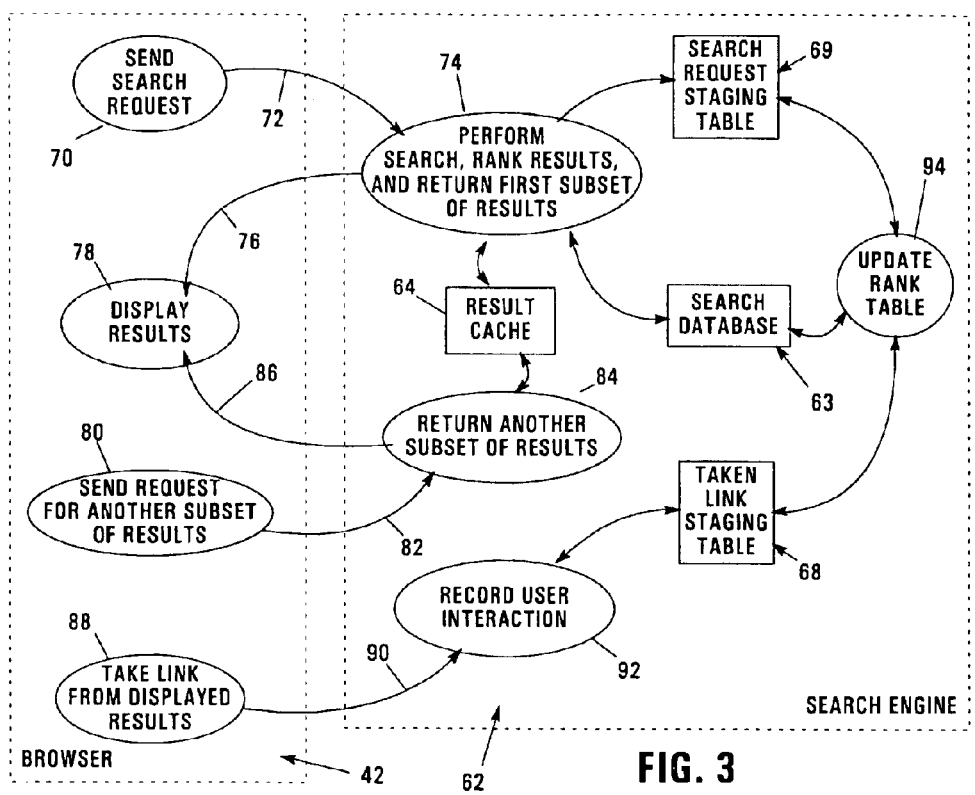

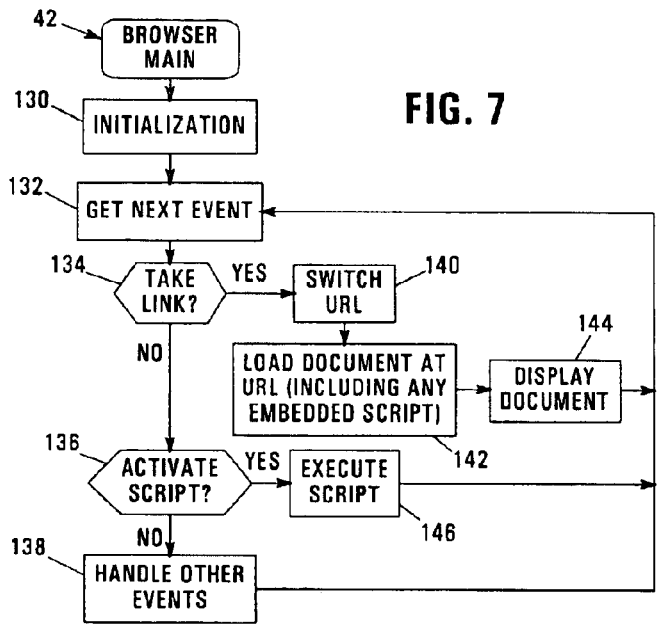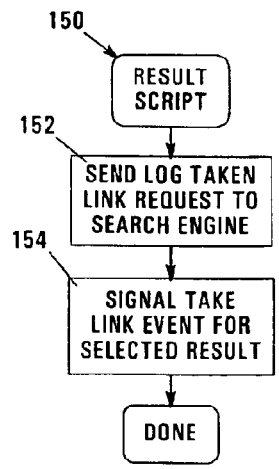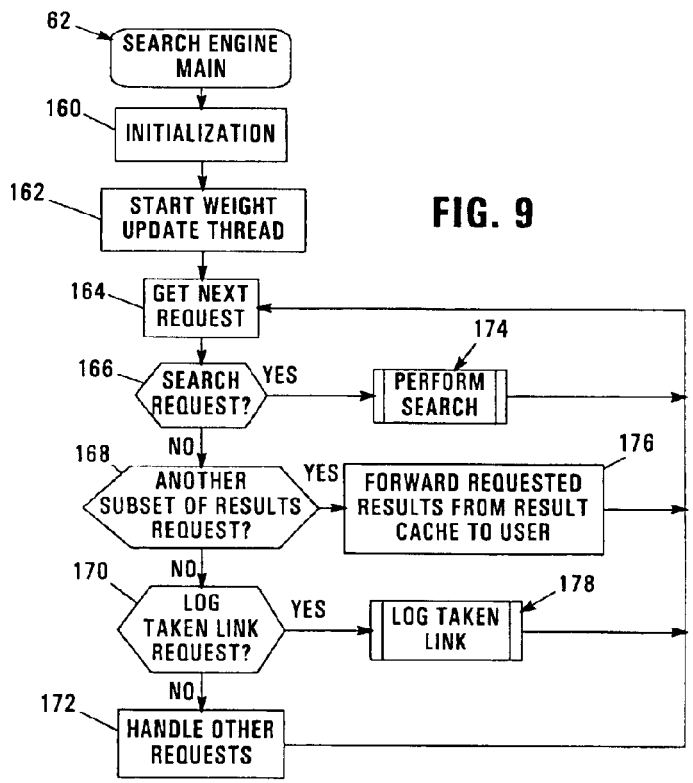
FIG. 7
FIG. 8
FIG. 9

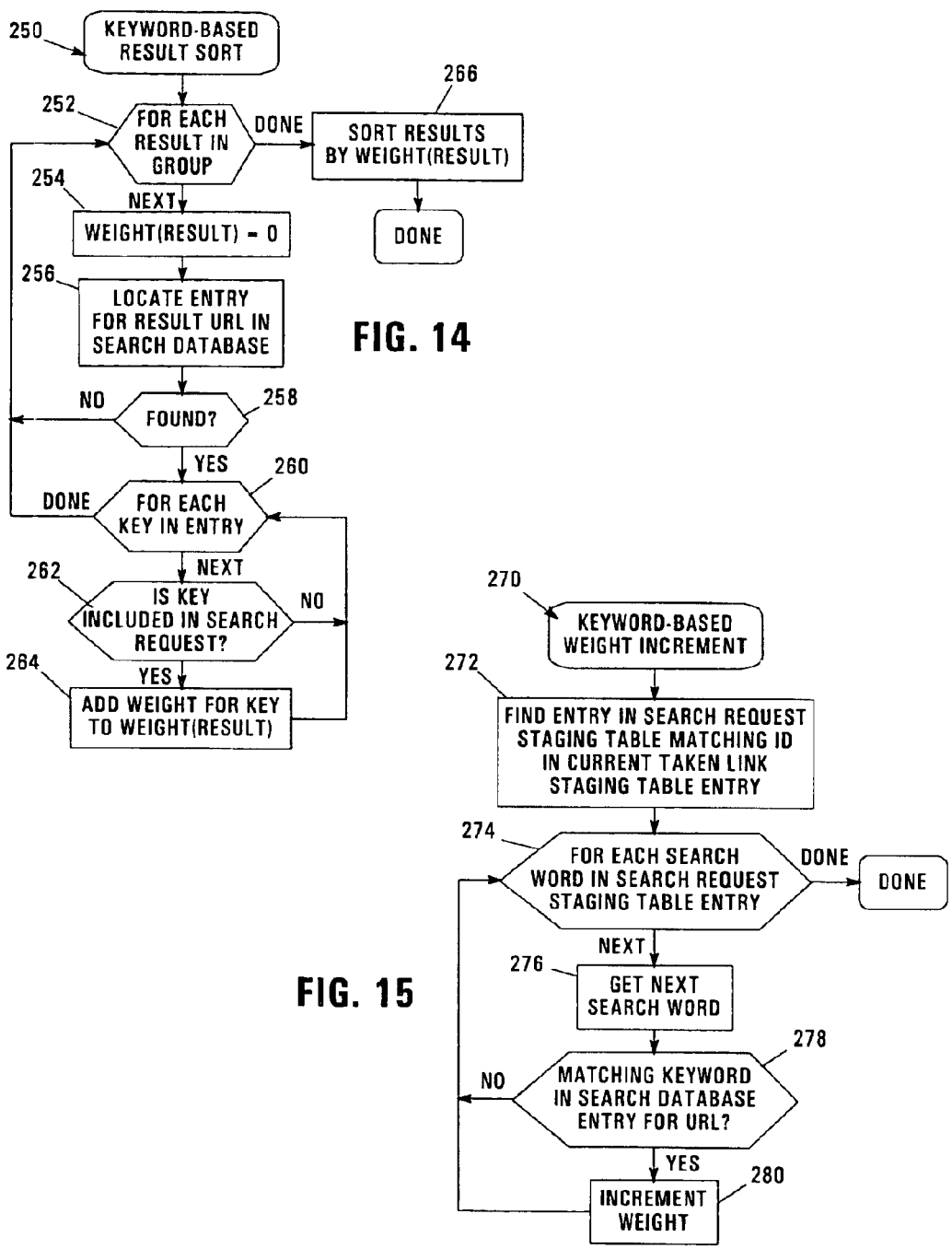

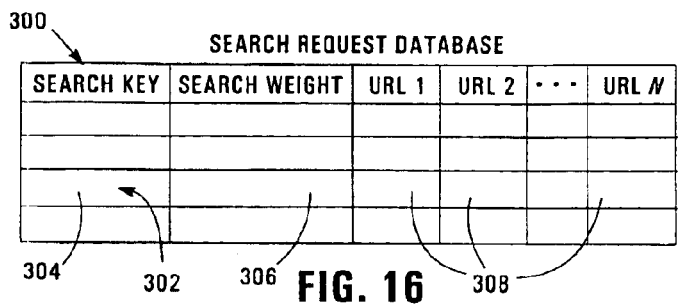
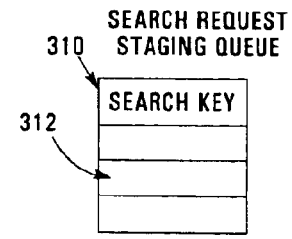
FIG. 16  FIG. 17
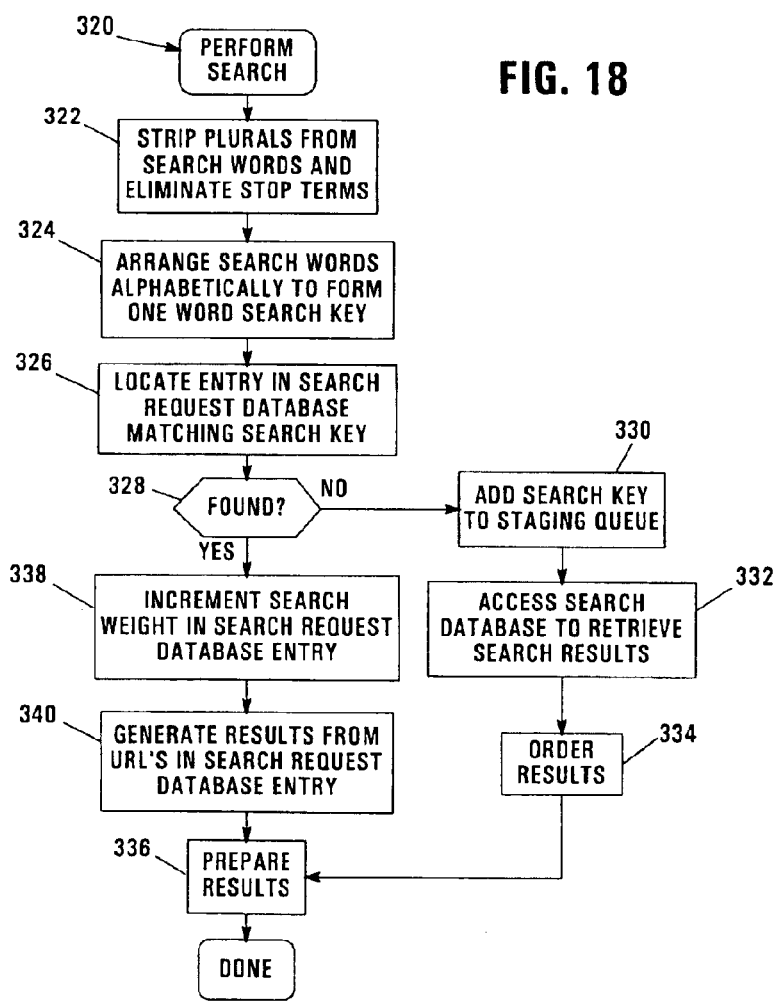
FIG. 18

ORDERING OF DATABASE SEARCH RESULTS BASED ON USER FEEDBACK

FIELD OF THE INVENTION

The invention is generally related to computers and computer software. More specifically, the invention is generally related to search engines and the display and interaction with results generated thereby.

BACKGROUND OF THE INVENTION

Due to advances in computer and networking technology, the amount and variety of information that can be accessed through a computer continues to increase at an astounding rate. The Internet, in particular, has enabled computer users to access a wide variety of information from computers located all over the world.

As the amount of information that can be accessed by a computer user increases, however, it becomes more and more difficult to sift through the available information to locate useful information. To address this concern, a considerable amount of effort has been directed towards improvements to search engines, which are generally computer programs that are used to access databases of information in response to queries submitted by users.

While search engines are commonly used to access a wide variety of databases, a predominant application of search engines is in accessing information from the Internet. For example, a search engine is often used to access directory services to identify documents that contain information about particular topics, similar in many respects to printed telephone directories. With directory services, documents are typically classified by topic, with the addresses of those documents, as well as basic summaries thereof, stored in records that are searchable by the search engine.

Search engines are also often used to access indexing services that attempt to catalog as many documents as possible from the Internet. Most indexing services typically construct databases of document records by "crawling" from document to document on the Internet, reading each document and cataloging important terms and words therefrom, and following the links provided in each document to locate additional documents.

With the amount of information available on the Internet increasing at an exponential rate, search engines continue to locate a greater number of documents matching a particular search request. As the number of located documents increases, the order in which those documents are presented to a user, also referred to as the "ranking" of the documents, becomes more important, as a user will typically look at the documents identified at the top of a list of search results before looking at documents identified later in the results.

Early search engines typically relied on generally rudimentary retrieval algorithms that ranked the results of queries based upon factors such as the number of search terms that were found in each document, the number of occurrences of each search term in each document, the proximity of search terms in each document, and/or the location of search terms in each document (e.g., giving greater weight to search terms being at the top, or in a title or heading, or a document). However, it has been found that ranking results purely by the placement and frequency of search terms often leads to poor rankings. As one example, some conventional search engines can be manipulated by document authors through a process known as "spamming", where search terms are inserted into documents in non-visible portions thereof for no other purpose but to increase relative rankings of the documents given by search engines.

To address such concerns, some conventional search engines rely on additional information to rank results. For example, the search engines for some indexing services weight documents more heavily based upon whether the documents are also listed in associated directory services. Other search engines use "link popularity" to rank results, granting higher rankings to documents that are linked to by other documents.

An additional type of information that may be used in ranking search results is based upon user interaction with documents. For example, it is possible with some search engines to monitor the amount of time that a user spends viewing particular documents identified in a set of search results and increasing the ranks of documents that have been viewed for longer times, based upon the premise that a user will spend more time viewing a more relevant document than viewing a less relevant document. However, the duration that a user spends viewing a document can also be dependent upon factors other than relevancy, e.g., if a document is large and the user has to spend a relatively long amount of time to determine that the document is not relevant. As a consequence, the duration that a user spends viewing a document may have only marginal applicability to the relevance of a document in certain instances.

While the above-described enhancements to conventional search engines have been successful to an extent in providing users with more relevant search results, a significant need continues to exist for further improvements in the manner in which search results are ordered and returned to users. In particular, it is believed that additional gains in the relevancy and usability of the results returned by search engines may be obtained through further reliance on the interaction of users with particular documents in the ordering of search results.

SUMMARY OF THE INVENTION

The invention addresses these and other problems associated with the prior art by providing a number of apparatuses, program products, and methods that rely on user interaction in the ordering search results returned by a search engine. Consistent with the invention, each of a plurality of records in a database is associated with a user feedback parameter that is used in ordering the records identified in a result set generated in response to a search request. The manner in which the user feedback parameter is configured, updated and utilized in ordering search results, however, can vary in different applications.

For example, consistent with one aspect of the invention, the user feedback parameter for a given record may be selectively updated in response to detecting multiple accesses thereto by a user. The value of this type of feedback mechanism is based upon the assumption that a user that revisits a particular record does so because the record is more relevant than a record that the user visits only once, or not at all.

Consistent with another aspect of the invention, the user feedback parameter for a given record may be selectively updated in response to detecting that the record is the most recently accessed record in the result set. The value of this type of feedback mechanism is based upon the assumption that often a record that a user accesses last from a result set is the last record accessed because the user has found the information that the user was searching for in the first place.

Consistent with yet another aspect of the invention, the user feedback parameter for a given record is configured with a plurality of weights that are respectively associated with particular keywords. Ordering of the records in a result set then utilizes only those weights that are associated with keywords that match the search request. As such, not only the interactions of users with particular records, but the contexts of such interactions, are considered in ordering search results.

Consistent with a further aspect of the invention, a search request data structure is utilized to store a plurality of search request records, each including a search request identifier identifying a unique combination of keywords, and a result set identifier identifying a subset of a plurality of records in a database that match the unique combination of keywords. The search request data structure is accessed in response to a search request to locate a search request record including a search request identifier that matches the keywords provided in the search request. A result set is then generated that identifies the subset of records identified in the result set identifier in the located search request record.

Among other advantages, the use of a search request data structure permits optimal result sets to be associated with particular search requests, such that future instances of the same search requests can return the same result sets in lieu of attempting to construct new result sets from scratch. Furthermore, in some applications it may be desirable to dynamically optimize the stored result sets, e.g., by utilizing user interaction with the records identified therein, so that future instances of the same search requests will benefit from the relevancy information obtained in prior iterations of such requests.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 3 is a block diagram of the operations that occur during interaction with a search engine in the computer system of FIG. 2.

FIGS. 4, 5 and 6 are respective block diagrams of the search database, the taken link staging table and the search request staging table of FIG. 2.

FIG. 7 is a flowchart illustrating the program flow of a main routine for the browser of FIG. 2.

FIG. 8 is a flowchart illustrating the program flow of an exemplary result script executed by the main routine of FIG. 7.

FIG. 9 is a flowchart illustrating the program flow of a main routine for the search engine of FIG. 2.

FIG. 14 is a flowchart of a keyword-based result sort routine for use with the alternate search database of FIG. 13.

FIG. 15 is a flowchart of a keyword-based weight increment routine for use with the alternate search database of FIG. 13.

FIG. 16 is a block diagram of a search request database consistent with the invention.

FIG. 17 is a block diagram of a search request staging queue for use with the database of FIG. 16.

FIG. 18 is a flowchart illustrating the program flow of an alternate perform search routine suitable for use with the database of FIG. 16.

DETAILED DESCRIPTION

Hardware and Software Environment

Figure 1:
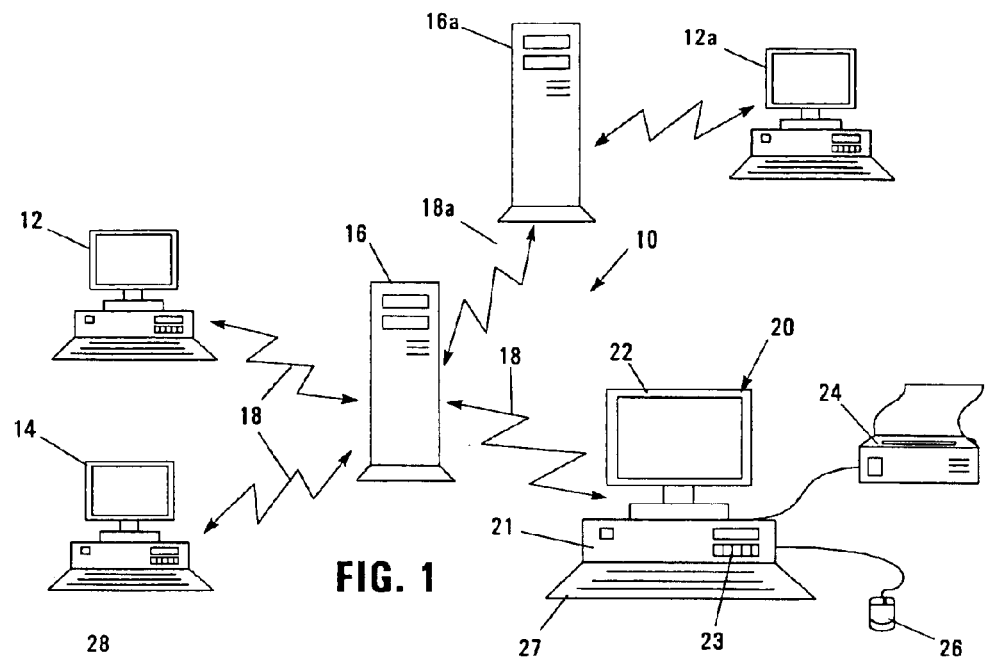
FIG. 1 is a block diagram of a networked computer system consistent with the invention.

Turning to the Drawings, wherein like numbers denote like parts throughout the several views, FIG. 1 illustrates a computer system 10 consistent with the invention. Computer system 10 is illustrated as a networked computer system that defines a multi-user computer environment, and that includes one or more client computers 12, 14 and 20 (e.g., desktop or PC-based computers, workstations, etc.) coupled to server 16 (e.g., a PC-based server, a minicomputer, a midrange computer, a main-frame computer, etc.) through a network 18. Also illustrated is an additional server 16a interfaced with server 16 over a network 18a, and to which is coupled a client computer 12a. Networks 18 and 18a may represent practically any type of networked interconnection, including but not limited to local-area, wide-area, wireless, and public networks (e.g., the Internet). Moreover, any number of computers and other devices may be networked through networks 18, 18a, e.g., additional client computers and/or servers.

Client computer 20, which may be similar to computers 12, 12a and 14, includes a central processing unit (CPU) 21; a number of peripheral components such as a computer display 22; a storage device 23; a printer 24; and various input devices (e.g., a mouse 26 and keyboard 27), among others. Server computers 16, 16a may be similarly configured, albeit typically with greater processing performance and storage capacity, as is well known in the art.

Figure 2:
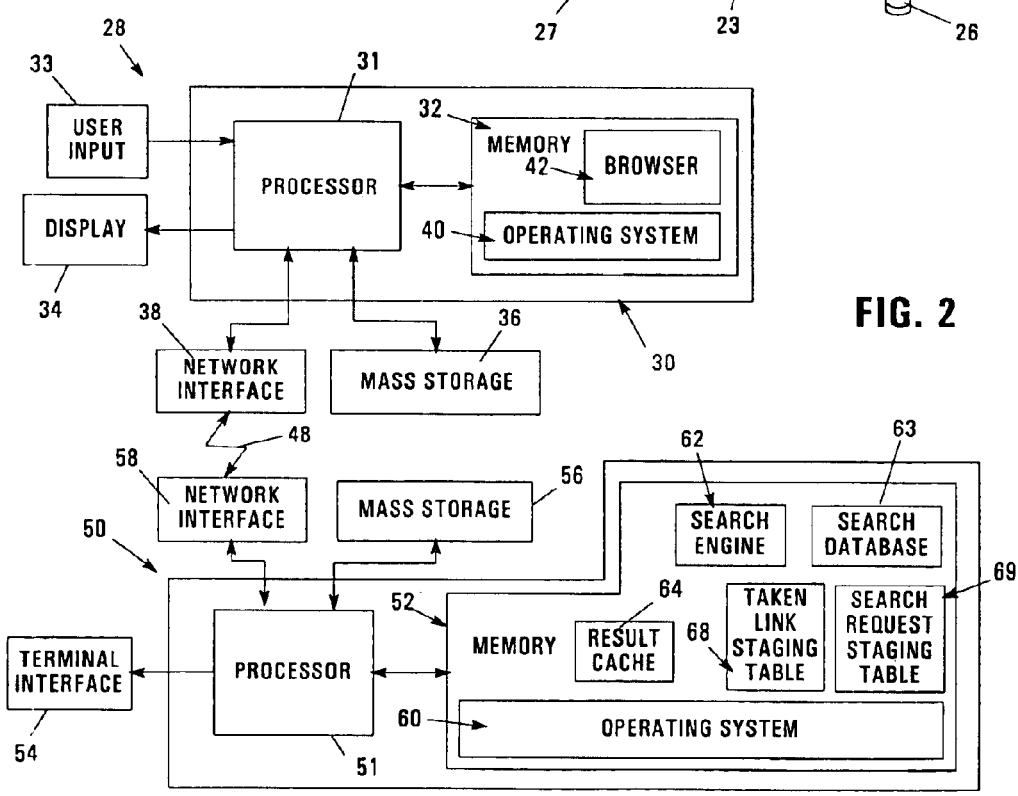
FIG. 2 is a block diagram of an exemplary hardware and software environment for the networked computer system of FIG. 1.

FIG. 2 illustrates in another way an exemplary hardware and software environment for networked computer system 10, including an apparatus 28 which includes a client apparatus 30 interfaced with a server apparatus 50 via a network 48. For the purposes of the invention, client apparatus 30 may represent practically any type of computer, computer system or other programmable electronic device capable of operating as a client, including a desktop computer, a portable computer, an embedded controller, etc. Similarly, server apparatus 50 may represent practically any type of multi-user or host computer system. Each apparatus 28, 30 and 50 may hereinafter also be referred to as a "computer" or "computer system", although it should be appreciated the term "apparatus" may also include other suitable programmable electronic devices consistent with the invention.

Computer 30 typically includes at least one processor 31 coupled to a memory 32, and computer 50 similarly includes at least one processor 51 coupled to a memory 52. Each processor 31, 51 may represent one or more processors (e.g., microprocessors), and each memory 32, 52 may represent the random access memory (RAM) devices comprising the main storage of the respective computer 30, 50, as well as any supplemental levels of memory, e.g., cache memories, non-volatile or backup memories (e.g., programmable or flash memories), read-only memories, etc. In addition, each memory 32, 52 may be considered to include memory storage physically located elsewhere in the respective computer 30, 50, e.g., any cache memory, or any storage capacity used as a virtual memory such as in a mass storage device or on another computer coupled to the respective computer 30, 50 via an external network.

Each computer 30, 50 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). Likewise, user interface with computer 50 is typically handled via a terminal coupled to a terminal interface 54.

For additional storage, each computer 30, 50 may also include one or more mass storage devices 36, 56, e.g., a floppy or other removable disk drive, a hard disk drive, a direct access storage device (DASD), an optical drive (e.g., a CD drive, a DVD drive, etc.), and/or a tape drive, among others. Furthermore, each computer 30, 50 may include an interface with one or more networks via a network interface 38, 58 (e.g., a LAN, a WAN, a wireless network, and/or the Internet, among others) to permit the communication of information with other computers coupled to the network.

Computer 30 operates under the control of an operating system 40, and executes or otherwise relies upon various computer software applications, components, programs, objects, modules, data structures, etc. (e.g., browser 42).

Likewise, computer 50 operates under the control of an operating system 60, and executes or otherwise relies upon various computer software applications, components, programs, objects, modules, data structures, etc. (e.g., search engine 62, search database 63, result cache 64, taken link staging table 68 and search request staging table 69). Moreover, various applications, components, programs, objects, modules, etc. may also execute on one or more processors in another computer coupled to either of computers 30, 50, e.g., in a distributed or client-server computing environment.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tapes, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Search Result Ordering Based on User Feedback

The embodiments illustrated herein generally operate by enhancing the generation and ordering of search results from a search engine in response to user interaction with the records comprising the search results. Furthermore, in the illustrated embodiment, the database accessed by the search engine is representative of an Internet-base utilized in connection with an indexing algorithm, and storing a plurality of records reflective of hypertext markup language (HTML-compatible documents stored on a network such as the Internet and/or a private network). As will be readily apparent to one of ordinary skill in the art, each record in the database includes at least an address of an associated document stored on a network, typically in the form of a uniform resource located (URL). Each record will typically include an index of all or at least the non-trivial terms, e.g., excluding "stop" terms such as "the" and "is", found in the document referred to by the URL. In the alternative, a complete copy of the document may also be stored within each record. It will be appreciated that a wide variety of indexing and database storage techniques for cataloging HTML documents may be used in different applications. Moreover, the use and configurations of such alternate cataloging and storage techniques are well within the understanding of those of ordinary skill in the art, and are beyond the scope of this disclosure.

While the illustrated implementations focus on the above-described Internet-based application, it will be appreciated that in the techniques described herein may be utilized in connection with enhancing the retrieval of data from any type of database. Therefore, the invention is not limited to the particular HTML-based implementation discussed herein.

The illustrated implementation relies on the use of a "user feedback parameter" that associates with each record in the database information pertaining to interaction of one or more users with the record. As used herein, the interaction of a user with a record can reflect any type of access to that record, as well as any access to the information represented thereby. For example, in the Internet-based implementation discussed herein, user interaction with a record for a particular hypertext document includes accesses to the document stored at the URL associated with the record.

Moreover, since that URL may be provided to a user in a search results hypertext document that is generated from the record, the actual user interaction will be with the actual document stored at the URL, and not specifically an access to the particular record associated therewith.

Moreover, a result set as used herein may be considered to include copies of the data provided in matching records for a search request, as well as identifications of such records. An identification may include, for example, the URL of the document represented by a record in an indexing database. Other manners of identifying a record and providing such an identification within a result set may be used in the alternative.

The user feedback parameter associated with each record includes one or more weights used to provide a ranking for a record relative to other records located in response to a search request. The weight or weights associated with each user feedback parameter may be us ed in ordering a subset of records in a result set in a number of manners.

For example, the relative weights of records in a result set may be the sole basis for ranking and ordering the members of the result set. In the illustrated implementation, however, user feedback is but one component used in ordering search results. Specifically, the primary manner of ordering search results is the perceived relevance of each record in terms of the degree in which each record matches the search request. For this primary ordering operation, any number of search engine parameters, e.g., the number of matching search terms, the proximity of search terms, the placement of search terms, the frequency of occurrence of each search term, etc., may be used. User feedback is utilized as a secondary ordering parameter to assist in the ordering of records having like relevancies.

To this extent, it is desirable in the illustrated implementation to partition a result set into a plurality of relevance groups, with each relevance group including records from the search request having like relevancies. User feedback is then utilized in ordering the members of each relevance group. A relevance group may be defined, for example, for records having identical relevancies. In the alternative, relevancy ranges can be defined to group together records having relevancies that are relatively close to one another. The relevancy ranges may be defined statically (e.g., grouping together records having relevancies within ninety-five to one hundred percent, ninety to ninety-five percent, etc.), or dynamically (e.g., by analyzing the relevancies of the records in the result set to locate clear delineations between clusters of records). It will further be appreciated that additional parameters may also be utilized in connection with user feedback to assist in ordering records in a result set. For example, other conventional parameters such as link popularity, presence on an associated directory listing, etc., may also be used.

A search engine consistent with the invention generally supports two primary operations for use in performing user feedback-based ordering of search results. One such operation is the initiation of a search request to return a result set that identifies one or more records from the database that matched the search request. A second operation is user interaction with the records in the result set, used to track user feedback with such records for the purpose of building a database of user feedback information for use in ordering future result sets.

FIG. 3, for example, illustrates the general operations handled by search engine 62 in response to requests from a user operating browser 42. As illustrated at block 70, for example, a user may initiate and send a search request 72 to search engine 62. In response to a search request, search engine 62 performs the search, ranks the results and returns a first subset of the results to the user, as represented at 76. The subset of results is displayed to the user in browser 42 as represented at 78.

Once a subset of results is displayed to a user, the user can interact with the results in two principle manners. First, as represented at block 80, the user can send a request 82 for another subset of results. Such a request is handled at block 84 in search engine 62, whereby another subset of results is returned to the user as represented at 86.

In addition, a user can interact with the results by selecting a link from the displayed subset of results, as represented at block 88. In response to such an operation, the hypertext document referenced by a link in the results is retrieved. In addition, a notification, illustrated at 90 is returned to search engine 62 and processed in block 92 to record the user interaction with the associated record.

Search engine 62 relies on a number of data structures in tracking user interaction and ordering search results. In performing a search, search engine 62 relies on a search database 63, which may include any number of database configurations. Moreover, a result cache 64 is typically utilized to store subsets of the results returned in response to a search request, such that the search database does not need to be re-queried whenever a user desires to view other results from a results set. In the illustrated implementation, the search engine constructs hypertext documents representing the subsets of results, e.g., with each hypertext document including hypertext links to a subset of records identified in response to the search request. Additional information, e.g., additional links to help facilities, advertisements, and the like may also be provided in each hypertext document stored in the result cache.

As will be discussed in greater detail below, search database 63 also includes user feedback parameter data associated with each record to assist in ordering search results. It will be appreciated, however, that the user feedback parameter data stored in the search database may be stored in a separate data structure in the alternative.

Search engine 62 periodically updates the user feedback information stored in search database 63, typically through a separate thread represented at block 94. Such information is updated in response to information stored in a pair of staging tables 68, 69. Table 68 is a taken link staging table that records information regarding the interaction of a user with a particular record from particular records in a result set. Table 69 is a search request staging table that is utilized to track search requests received from users of these arch engine. Tables 68 and 69 are respectively updated in response to user interactions with results and user initiation of search requests, with the search engine periodically utilizing the information stored in these tables to update the search database with current information. As a consequence, over time, it is anticipated that search database 63 will develop a more useful indication of the most used, and presumably most relevant documents represented by the records in the search database.

FIG. 4 illustrates one suitable implementation of search database 63 consistent with the invention. Search database 63 is shown as a table including a plurality of entries 100, with each entry representing a record including a document identifier field 102 within which is stored a URL for an associated document, as well as a weight field 104 representing the user feedback parameter associated with the URL stored in field 102. A plurality of additional key fields 106 are utilized to store each non-trivial keyword found in the associated document. Other information, e.g., relating to the frequency, and/or placement of each keyword, as well as other information known in the search engine art, may also be included in the alternative. Further, other data structures, many of which are also known in the art, may also be used to store the information in each URL record.

FIG. 5 illustrates one suitable implementation for taken link staging table 68. Table 68, for example, includes a plurality of entries 110, each including a search identifier field 112 within which is stored a unique identifier for a particular search request. Each entry further includes a document identifier field 114 within which is stored a URL, and fields 116 and 118 respectively store a taken count and a time stamp associated with that URL. Taken count field 116 specifically stores the number of accesses to the associated URL by the user that accessed the URL in response to the search request identified in field 112. Time stamp field 118 records the time at which the associated URL was last accessed by the user.

FIG. 6 next illustrates one suitable implementation of search request staging table 69, shown including a plurality of entries 120, with each entry including a search identifier field 122 within which is stored a unique identifier for a particular search request. The various search words comprising the search request are stored in fields 124 of each entry 120.

It will be appreciated that a wide variety of alternate data structures may be utilized for storing the information within each of tables 68–69. In particular, in many applications, it may be desirable to utilize more efficient data structures to improve the access speed and/or reduce the storage capacity required to store the data in each of the noted tables. It will therefore be appreciated by one of ordinary skill in the art that the use of tables to store the data described herein for use in tracking user interaction with records is merely for the purpose of facilitating an explanation of the invention.

FIGS. 7–12 illustrate the primary operations that occur in the browser and search engine in performing a search request and interacting with the results thereof in a manner consistent with the invention. In the illustrated implementation, tracking of user interactions with search result records is handled through the use of embedded scripts provided in connection with the results and used to provide notification to the search engine of user interaction with specific records. One suitable script implementation, for example, is Javascript, supported by most commercially-available browsers. The embedded script may be provided as a component of an HTML document supplied to a user and representing a subset of the results generated in response to a search request.

An advantage of this particular implementation is that user interaction tracking may be performed using a conventional browser, and without requiring any modifications or customizations thereto. So long as a browser supports the particular script language within which the notification feature of the invention is implemented, that browser typically can process the notification code in such a manner that a notification is provided to the search engine automatically in response to user selection of a record.

It should be appreciated, however, that alternate manners of providing notification to the search engine of user interaction with a record may be used in the alternative. For example, a resident computer program on a computer could be utilized to track user interaction with records, with the computer program providing notifications to the search engine on a periodic basis. Furthermore, such a program could be integrated into the browser, e.g., as a plug in or customization thereof.

Moreover, a computer program could be downloaded to the user's computer, e.g., in the form of a JAVA applet or an Active X control. Furthermore, tracking functionality could be implemented within the search engine or within another computer (e.g., a web server or the like) through which the browser retrieves the results. As an example, the result documents returned to a user from the search engine could have hypertext links pointing to documents stored on the server computer for the search engine such that the search engine can detect user selection of the link. Such documents could then automatically forward the user to the requested result document through suitable HTML-compatible tags. Other manners of tracking the navigation of users to and from various hypertext documents and the like may also be used in the alternative.

FIG. 7 illustrates a main routine executed by browser 42 for use in interacting with a user. Routine 42 generally begins with various initialization operations represented at block 130, then proceeds to an event-driven loop initiated in block 132, the general operation of which is well understood in the arts Several events which are specifically relevant to an understanding of the invention are detected in block 134 and 136. Additional events handled by a browser, but which are not particularly relevant to the invention, are handled in a conventional manner as represented at block 138.

One event that is handled by browser 42, for example, is a take link event, which is detected at block 134 and handled by passing control to block 140. A take link event is generated, for example, in response to user selection of a hypertext link, selection of a bookmark, user input of a particular URL in an address bar, or in other manners well known in the art. In response to a user request to take a link, block 140 switches the current URL for the active browser window to reflect that indicated as destination of the link. Next, in block 142, the document stored at the requested URL is loaded by the browser, either from local storage or from remote storage over a network. Next, once the document is retrieved, control passes to block 144 to render and display the document on the user's computer display. Control then returns to block 132 to wait for additional events.

Another event handled by browser 42 is an activate script event, which occurs when a user performs an operation (e.g., selecting a link) that is associated with an embedded script. Such an event is detected in block 136 and handled in block 146 by executing the script. Execution is specific to the particular script language, and is well known in the art. Once executed, control returns to block 132.

As discussed above, tracking of user interaction with records from a result set is handled by embedding an executable script in the result documents returned to a user. To do so, in lieu of providing hypertext links to the documents associated with each record in the result set, a user is provided with a record identifier that is linked to an executable script that both (1) notifies the search engine of a user interaction with the record, and (2) initiates navigation to the document associated with that record. For example, FIG. 8 illustrates an exemplary result script 150 that includes the operation of sending a "log taken link" request to the search engine (block 152) and signal a take link event for the selected result (block 154). The log taken link request provided to the search engine typically includes the ID of the search request with which to associate the request, as well as the URL of the document that the user has taken. The first operation results in tracking of the user navigation, while the latter operation initiates navigation to the selected result. As another example, an exemplary HTML result document incorporating JavaScript program code suitable for performing the above-described functionality is shown below in Table I:

TABLE I

Example HTML Result Document

```
1  <HTML><TITLE>Any Title</TITLE><BODY>
2  <SCRIPT LANGUAGE = "JavaScript">
3  function clickHandler(e)
4  {
5  var unique_id = 3245;
6  var Ink = e.target;
7  document.links[1].host = "www.searchEngine.com/cgi-
       bin/results?id=unique_id&link=Ink";
8  return true;
9  }
10 window.captureEvents(Event.CLICK);
11 window.onClick = clickHandler;
12 </SCRIPT>
13
14 <FORM>
15 <pre> Simple Text to Display </pre>
16 <A HREF = "http://www.aFirstLinkToTake.com">
17 A first link to take</A>
18 <BR
19 </BR>
20 <A HREF = "http://www.aSecondLinkToTake.com">
21 A second link to take</A>
22 </FORM>
23 </BODY>
24 </HTML>
```

FIG. 9 next illustrates the operations performed by search engine 62 in greater detail. Starting with conventional initialization at block 160, block 162 starts a weight update thread, used to periodically update the user feedback parameter data in the search database with the information generated in the staging tables in response to user interaction with the search engine and the results presented thereby.

Next, at block 164, an event-driven loop is initiated to process incoming requests received from users of the search engine. For each such request, the request is decoded, and based upon the type of request, is handled by an appropriate request handler. Several types of requests which are relevant to an understanding of the invention, are detected at blocks 166–170. Additional requests, which are not particularly relevant to an understanding of the invention, are handled in a conventional manner as illustrated by block 172.

Search requests received from user are detected in block 166, and handled via a perform search routine 174. Requests for additional subsets of previously retrieved results are detected at block 168 and handled in block 176 by forwarding the requested results from the result cache to the user, an operation which is well understood in the art. Requests to log taken links, received from users in response to links taken from a result document, are detected in block 170 and handled by a log taken link routine 178.

Figure 10:
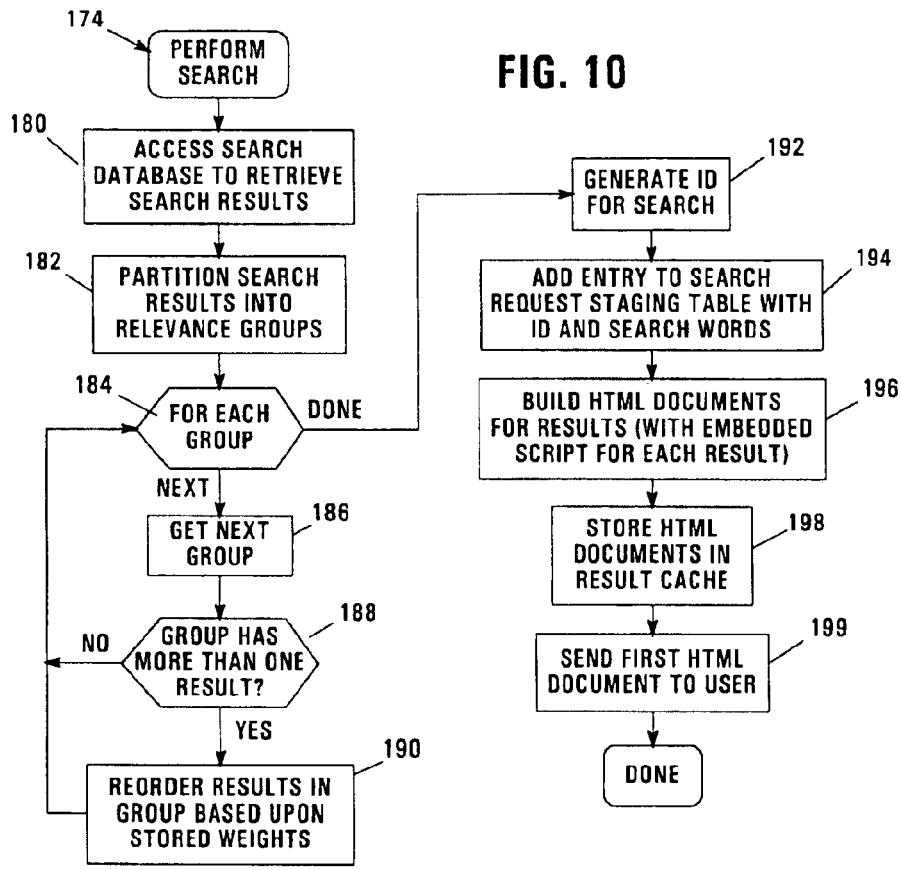
FIG. 10 is a flowchart illustrating the program flow of the perform search routine of FIG. 9.

Perform search routine 174 is illustrated in greater detail in FIG. 10. Routine 174 begins in block 180 by accessing the search database to retrieve search results, in a manner known in the art. Next, in block 182, the search results are partitioned into relevance groups, and in block 184, a loop is initiated to process each such relevance group.

For each such group, control passes to block 186 to retrieve the records in the next relevance group. Next, block 188 determines whether the group has more than one result. If not, control returns to block 184 to process additional relevance groups. If, however, more than one result is provided in the same group, the results are reordered in block 190 based upon the relative weight for the various results as stored in the search database. Control then returns to block 184 to process additional relevance groups.

Once all relevance groups have been processed, block 184 passes control to block 192 to generate a unique identifier for the present search. Next, block 194 adds an entry to the search request staging table including the generated ID and the search words provided with the search request. It should also be appreciated that, rather than utilizing search words and keywords, boolean expressions, or other search terminology may also be supported, whereby the configuration of the search database and each table would be modified to support the additional search functionality.

Next, block 196 constructs one or more HTML documents for the results, embedding for each such result a suitable script program that implements the functionality described above in connection with FIG. 8. Each HTML document typically includes a subset of the results, often broken into a predetermined number of results (e.g., 20 results per document). Once all of the documents have been constructed, block 198 stores the documents in the result cache. Next, block 199 sends the first document to the user as the initial results of the search. Routine 174 is then complete.

Figure 11:
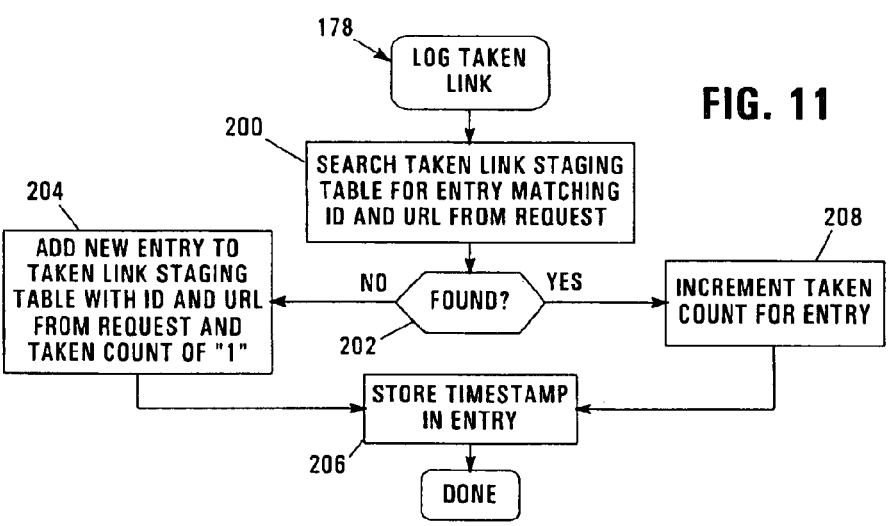
FIG. 11 is a flowchart illustrating the program flow of the log taken link routine of FIG. 9.

FIG. 11 next illustrates log taken link routine 178, which begins in block 200 by searching the taken link staging table for an entry matching the ID and URL provided with the request.

Next, block 202 determines whether a matching entry was found. If not, control passes to block 204 to add a new entry to the taken link staging table, using the ID and URL from the request, and storing an initial value of one in the taken count field thereof Control then passes to block 206 to store the current time recording the most recent interaction with the record.

Returning to block 202, if an existing entry is found, control passes to block 208 to increment the taken count value stored in the entry. Control then passes to block 206 to store the current time as a time stamp for the entry. Upon completion of block 206, routine 178 is complete.

Figure 12:
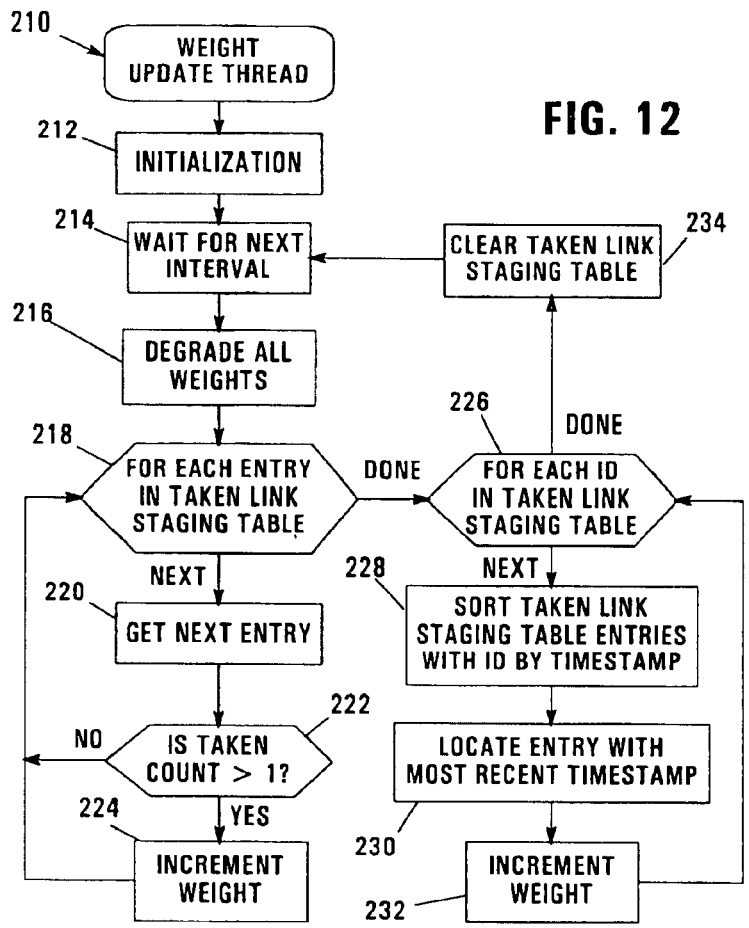
FIG. 12 is a flowchart illustrating the program flow of the weight update thread initialized in the main routine of FIG. 9.

FIG. 12 next illustrates the primary program flow of a weight update thread 210 consistent with the invention. After routine initialization operations in block 212, control passes to block 214 to wait for a next interval at which to update the weight in the search database. The interval may be based on a periodic basis, or in the alternative may be based upon the utilization of the search engine by users (e.g., when free time is available). For each interval, control passes to block 216 to degrade all weights in the search database by a predetermined amount. The result of this operation is to degrade the relevance of documents that have not been accessed in a relatively long time period. In the alternative, no degradation of the weights may be performed.

Next, block 218 initiates a FOR loop to process each entry in the taken link staging table. For each such entry, control passes to block 220 to retrieve the next entry. Next, block 222 determines whether the taken count stored in the entry is greater than one, indicating that the link has been taken multiple times. If so, an increment operation 224 is performed to promote the record relative to other records based upon this particular user feedback. For example, a predetermined amount may be added to the weight, which may be constant or scaled by the number of hits.

Once the weight has been updated, control returns to block 218 to process additional entries in the table. Further, returning to block 222, if the taken count is not greater than one, routine 224 is bypassed.

Once each entry in the taken link staging table has been processed, block 218 passes control to block 226 to increase the weights of entries in the search database based upon what documents are accessed last in response to a search request. Block 226 thus initiates a loop to process each search request identifier in the taken link staging table. For each such identifier, control passes to block 228 to sort the taken link staging table entries associated with the ID by time stamp. Next, block 230 locates the entry having the most recent time stamp, and in response thereto, performs an increment weight operation 232 to increase the weight of the URL associated with the entry having the most recent time stamp. For example, a predetermined amount may be added to the weight (which may be scaled relative to the taken count amount to emphasize one type of interaction over the other). Control then returns to block 226. Once each ID in the taken link staging link has been processed, block 226 passes control to block 234 to clear the entries from the taken link staging table, and then control passes back to block 214 to wait for the next interval to update the weights.

It should be appreciated that additional concerns may be utilized to update the relative weights of entries in the rank table. For example, the duration of time that a document is viewed may also be utilized in weighting records. Moreover, the relative scalings of the various types of interactions can be set to emphasize certain interactions relative to others.

Various modifications may be made to the above-described embodiments consistent with the invention. For example, a mechanism for removing entries from the rank table and/or any of the staging tables may be utilized to minimize the amount of space occupied by each of the tables. For example, it may be desirable to reset weights in the search database when the weights thereof fall below a predetermined threshold.

Figure 13:
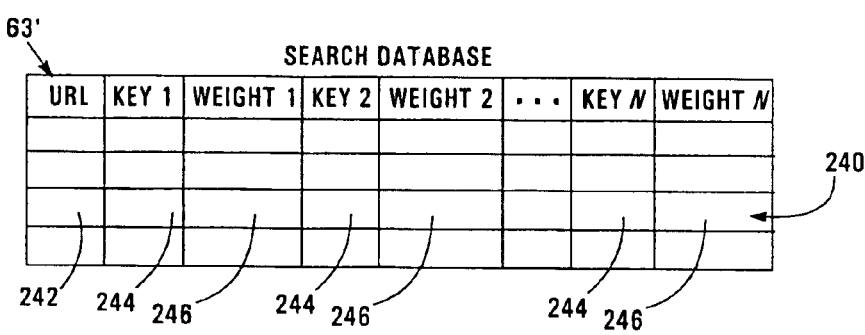
FIG. 13 is a block diagram of an alternate search database to that of FIG. 5.

It may also be desirable to utilize a context-based weighting algorithm to weight the user feedback parameter associated with a given record based upon the context in which users interact with a record. For example, FIG. 13 illustrates an alternate search database 63' including a plurality of entries 240, each including a document identifier field 242 and a plurality of key fields 244 representing the keywords associated with the document identified in field 242. Rather than using one weight as the user feedback parameter for the document, however, a plurality of weights are stored in fields 246, each associated with a particular keyword. In this implementation, weights are updated and utilized based upon the match of keywords with a particular search request with which the user is interacting with the record. As such, weights associated with a particular document are increased only when the keywords associated with such weights are accessed by a user in connection with a search request that matches such keywords. Then, when a user later performs a search request that returns the document as a result thereof, the relative ordering of that document is based upon those weights associated with keywords matching the new search request. The relative relevance of a particular document is thus based upon the context in which it was located by a search request.

As an example, suppose a document has a high weight because of past popularity, principally in response to a large number of searches hitting on the words "zoo", "bear", and "animals". For future searches that search for the same words, all of the weights associated with those words would be considered in ordering the record in a results set. However, if a future search used the search terms "zoo", "reptile" and "egg", only the weight associated with the keyword "zoo" would be significant to the ordering of the record.

In this regard, FIG. 14 illustrates a keyword-based results sort routine 250 that may be performed in the alternate implementation in lieu of block 190 of routine 174 in FIG. 10. Routine 250 begins in block 252 by initiating a FOR loop to process each result in a relevance group. For each such result, block 254 sets a weight associated with the result to zero. Block 256 next locates an entry for the URL associated with the result in the search database. If no such entry is found, block 258 next returns control back to block 252 to process additional results. If an entry is found, however, control passes to block 260 to initiate a nested FOR loop to process each keyword in the located entry. For each such keyword, block 262 determines whether the keyword is included in the search request. If not, control returns to block 260 to process additional keywords. If, however, the keyword is found, control passes to block 264 to add the weight associated with that keyword to the overall weight associated with the result. Control then returns to block 260 to process additional keys. Once all such keys have been processed, control then returns to block 252 to process additional results. Once each result is processed, a summed weight value, based upon only those weights associated with matching keywords, is computed. Block 252 then passes control 266 to sort the results in the relevance group by their relative computed weights. Upon completion of the sorting operation, routine 250 is complete.

FIG. 15 illustrates a keyword-based weight increment routine 270 that may be performed in the alternate implementation in lieu of each of blocks 224 and 232 of weight update thread 210 in FIG. 12. Routine 270 begins in block 272 by finding the entry in the search request staging table that matches the ID in the current taken link staging table entry. Next, block 274 initiates a FOR loop to process each search word in the search request staging table entry. For each such search word, block 276 retrieves the search word from the entry, and block 278 determines whether a matching keyword is found in the search database entry for the URL specified in the current taken link staging table entry. If so, the weight associated with that search word is incremented in the search database entry, and control returns to block 274. The weight increment operation can, for example, add a predetermined amount to the weight which is either constant, or scaled based on interaction type (taken count or last taken), or by the number of hits, as discussed in greater detail above.

Returning to block 278, if no matching keyword is found in the search database entry, block 278 passes control directly to block 274 to process additional search words. Once all such search words have been processed, routine 270 is complete. As such, routine 270 operates to increment only those weights associated with the search words that a particular user has used to access a given URL through the search engine. It should also be appreciated that in some implementations it may be desirable to also increment the weights associated with the other search words associated with a particular URL, typically with a lower amount than those search words that match the keywords associated with a given URL.

FIGS. 16–19 illustrate yet another embodiment of the invention that utilizes a unique search request database structure to store prior searches and the search results thereof to enhance the retrieval of search results for given combinations of search words. As shown in FIG. 16, a search request database 300 includes a plurality of entries 302, each including a search key field 304, a search weight field 306 and plurality of URL fields 308. The search key field 304 stores a key associated with a given combination of search words. For example, it may be desirable to generate a key by taking the search words that a user enters into a search engine, strip off the plurals, and remove any stop terms included in the search request. Then, the search words can be arranged alphabetically and concatenated into a single word to form the key. As an example, a search for "black" and "bears" and "zoo" would result in the generation of a search key having the plural stripped from "bears" and the search words arranged alphabetically to create a search key of "BearBlackZoo". A search for "polar" and "bear" and "Alaska" would create a search key "AlaskaBearPolar".

Other manners of generating a search key that uniquely identifies any combination of search terms may also be used in the alternative. Moreover, it may be desirable to include boolean functionality in a search key such that search requests including boolean operations may also be represented uniquely in a search request database.

Search weight field 306 stores a search weight that is utilized to track the usage of a particular search request. The search weights may be utilized to rank search keys by popularity, and periodically gravitate more frequently used search keys to the top of the table, and eventually discard any rarely used search requests to maintain an appropriate database size.

URL fields 308 store a list of URL's representing the search results for the search request represented by the search key. In many implementations, it may be desirable to represent fields 308 using a linked list data structure. Moreover, in the illustrated implementation, weights associated with each URL are maintained in the original search database, e.g., as disclosed above in connection with either of FIG. 4 or 13. Such weight information may then be used (with or without other relevancy information) to order the URL's in the stored list of URL's. In the alternative, however, such weighting information may also be maintained within a search request database as well. Other data structures suitable for storing the information represented in database 300 may be used in the alternative.

As shown in FIG. 17, another data structure utilized in this alternate implementation is a search request staging queue 310, including a plurality of search key entries 312, each storing a search key for a search request that has been entered by a user, but not yet incorporated into the search request database. Other data structures may also be utilized in the alternative.

FIG. 18 next illustrates a perform search routine 320 which may be used as an alternative to routine 174 in this alternate implementation. Routine 320 begins in block 322 by stripping the plurals from the input search request and eliminating stop terms therefrom. Block 324 next arranges the search words alphabetically to form a single word search key, and block 326 then attempts to locate an entry in the search request database matching that search key.

Block 328 next determines whether such an entry was found. If not, control passes to block 330 to add a search key to the staging queue, indicating that a previously untracked search request has been entered by a user. Block 332 next accesses the search database to retrieve the search results, in a manner similar to that described above in connection with routine 174. Next, block 334 orders the results based on user interaction therewith. While other manners of ordering the results may be utilized, the operations discussed above in connection with blocks 182–190 of routine 174 (FIG. 10) may be utilized to implement the functionality of block 334.

Control next passes to block 336 to prepare the results, e.g., by performing the operations described above in connection with blocks 192–199 of routine 174 (FIG. 10). Specifically, an ID is generated for the new search, an entry is added to the search request staging table, and HTML documents representing the various results are generated and stored in the result cache. Furthermore, the first such document is sent to the user for display on the user's computer. Once the results are prepared in the manner described herein, routine 320 is complete.

Returning to block 328, if a matching entry is found in the search request database, control passes to block 338 to increment the search weight for that entry, to indicate that the entry has been used. Next, block 334 generates a result set from the URL's provided in the entry, and control then passes to block 336 to prepare the results in the manner described above. Upon preparation of the results, routine 320 is then complete.

Figure 19:
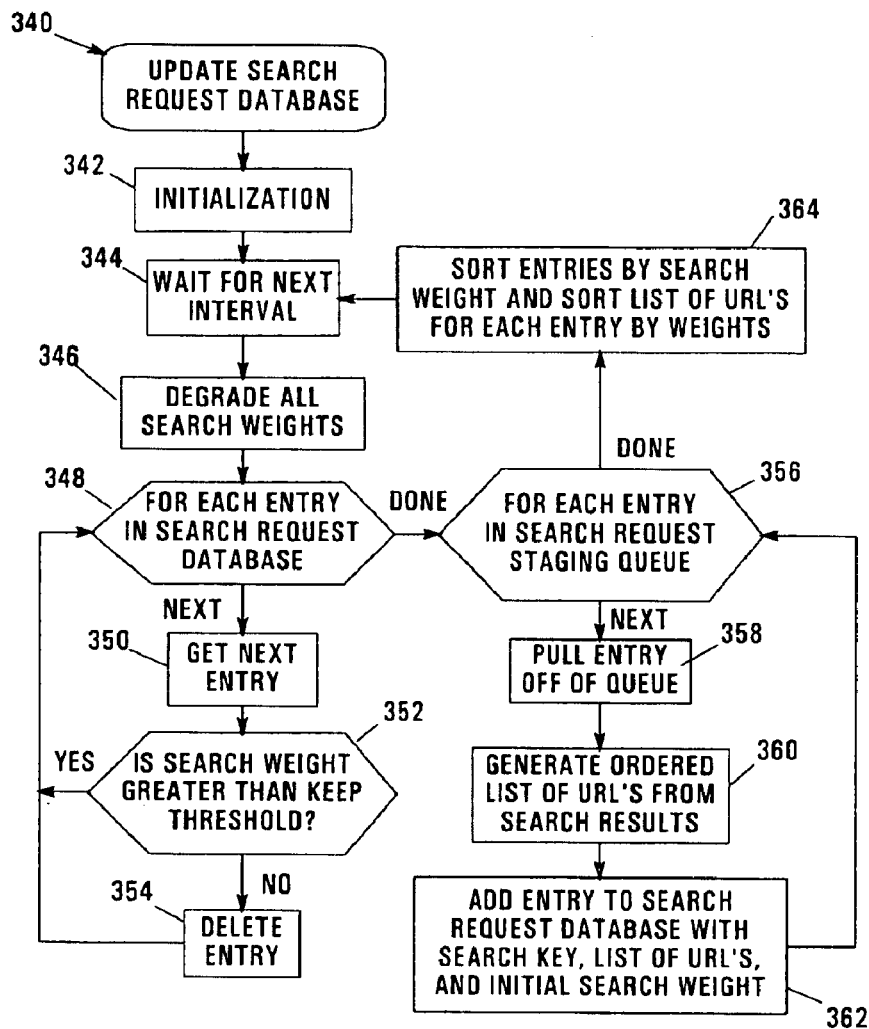
FIG. 19 is a flowchart illustrating the program flow of an update search request database thread for use in updating the database of FIG. 16.

FIG. 19 next illustrates an update search request database routine 340 that may be periodically executed to perform maintenance on the search request database. First, in block 342, the request thread is initialized, and then in block 344, the thread waits for a next appropriate interval. Typically, the interval for updating the search request database is less frequent than that for updating the weights. For example, it may be desirable to limit processing of the search request database to periods of low usage, e.g., during nights or weekends, to minimize the impact on user response to the search engine.

At each interval, control passes to block 346 to degrade all search weights by a predetermined amount. Next, block 348 initiates a FOR loop to process each entry in the search request database. For each such entry, block 350 retrieves the entry from the database, and block 352 determines whether the search weight is greater than a "keep" threshold. A "keep" threshold is a value set to determine when a particular search key has gone unused long enough such that it should be discarded as being irrelevant or unuseful. Whenever the search weight for an entry falls below the threshold, block 352 passes control to block 354 to delete the entry, prior to passing control back to block 348 to process additional entries. If the search weight is greater than the "keep" threshold, however, block 352 bypasses block 354 and passes control directly to block 348.

Once each entry in the search request database has been processed, block 348 passes control to block 356 to initiate a second FOR loop to process each entry in the search request staging queue. For each such entry, the entry is pulled off of the queue in block 358, and block 360 generates an ordered list of URL's from the search results generated for the search request. The list is ordered based upon the relative weights of the URL's. Next, block 362 adds a new entry to the search request database using the search key, list of URL's, and an initial search weight (of some amount above the "keep" threshold) as the parameters for the entry. In the illustrated embodiment, it is desirable to insert the entry into the table at a depth based upon the relative search weight for the entry. Control then returns to block 356 to process additional entries in the queue.

Once all such entries are processed, block 356 passes control to block 364 to sort the entries by search weight, as well as sort the list of URL's in each entry based upon the current weights stored for each such URL. By sorting the entries, more frequently used search keys will be accessed quicker. Furthermore, by sorting the list of URL's within each entry, the retrieval of the URL's as results during processing of a new search request is simplified. Control then return to block 344 to wait for a next interval.

It should be appreciated that various modifications may be made to the illustrated alternate implementation consistent with the invention. For example, the list of URL's within each entry can be sorted based upon relevance groups, as described above. Such a modification would typically entail storing some indication of the relevance of each URL stored for a particular search key. In addition, sorting of URL's and/or entries may be omitted in some implementations. In addition, in other implementations it may be desirable to return both the list of URL's provided with a particular search key, as well as additional results provided through a conventional search using the search engine. Selection of which method to utilize in response to a search request may also be a user-configurable option.

By maintaining a separate search request database, often the speed and quality of search results can be improved. In particular, through ordering of URL's associated with particular search keys, optimal results for a given search request may be developed over time and returned to users, thereby improving the quality of the search results to such users. Moreover, through the routine maintenance of the database, the size and performance of the database can be maintained at acceptable levels.

Various additional modifications may be made to the illustrated embodiments without departing from the spirit and scope of the invention. For example, the use of a search request database may be independent of any user feedback ordering, whereby optimum result sets are simply stored in a search request database and retrieved quickly for users, without any tracking of user feedback utilized. Moreover, the search request data structure need only identify URL's of documents stored on a network such as the Internet independent of any search database, whereby the "database" of records represented by a list of URL's may simply be the underlying network, with the records being the actual documents being identified in the search request database entry.

The search engine techniques described herein may also be used locally for a given user or a group of specific users, rather than relying on the previous interactions by all users of a search engine. Moreover, the search engine may be implemented on an internal network, thus enabling, for example, a group of employees having related job functions to be the sole users through which user interaction data is tracked. Other manners of selecting a relevant set of users from which to obtain relevant user feedback information may also be used in the alternative.

Other modifications will be apparent to one of ordinary skill in the art. Therefore, the invention lies in the claims hereinafter appended.

What is claimed is:

1. A method of accessing a database, the method comprising:
   (a) in response to a search request, generating a result set including identifications of a subset of a plurality of records in a database that match the search request;
   (b) ordering the identifications of the records in the result set using a user feedback parameter associated with each record in the result set; and
   (c) for each of the plurality of records, selectively updating the user feedback parameter associated therewith in response to detecting multiple accesses thereto by a user.

2. The method of claim 1, wherein selectively updating the user feedback parameter includes increasing a weight for the user feedback parameter associated with a first record in response to the number of times a user accesses the first record.

3. The method of claim 1, further comprising increasing a weight for the user feedback parameter associated with a first record in response to the first record being the most recently accessed record in the result set.

4. The method of claim 1, wherein the user feedback parameter associated with each record includes a plurality of weights, each weight associated with a keyword in the associated record, and wherein ordering the records in the result set using the user feedback parameter associated with each record in the result set includes ordering the records using any weight associated with a keyword matching the search request.

5. The method of claim 4, wherein selectively updating the user feedback parameter includes increasing a first weight for the user feedback parameter associated with a first record in response to receipt of a search request matching a first keyword associated with the first weight.

6. The method of claim 1, wherein generating the result set includes accessing a search request data structure that includes a plurality of search request records, each including a search request parameter identifying a unique combination of keywords, and a result set parameter identifying a subset of records in the database that match the unique combination of keywords.

7. The method of claim 1, wherein ordering the identifications of the records in the result set using the user feedback parameter associated with each record in the result set includes:
   (a) partitioning the result set into a plurality of relevance groups, with each relevance group including identifications of records having like relevancies to the search request; and
   (b) sorting the identifications of records within each relevance group according to the user feedback parameters associated therewith.

8. The method of claim 1, wherein each record in the database includes a Uniform Resource Identifier (URL) that identifies a document stored on a computer network, wherein selectively updating the user feedback parameter includes selectively updating the user feedback parameter associated with a first record in the database in response to detecting multiple accesses to the document stored at the URL associated with the first record.

9. The method of claim 8, wherein generating the result set includes generating at least one hypertext document including a plurality of hypertext links, each of which configured to access a document identified by a record in the result set.

10. The method of claim 9, wherein generating the hypertext document includes generating a script associated with at least one of the records in the result set, the script configured to generate a notification that the associated record has been accessed by a user, and wherein detecting multiple accesses to the document stored at the URL associated with the first record includes receiving the notification.

11. An apparatus, comprising:
   (a) a memory within which is resident a plurality of records from a database, each record associated with a user feedback parameter;
   (b) a first program, resident in the memory, the first program configured to, in response to a search request, generate a result set including identifications of a subset of the plurality of records that match the search request, and to order the identifications of the records in the result, set using the user feedback parameter associated with each record in the result set; and (c) a second program, resident in the memory, the second program configured to, for each of the plurality of records, selectively update the user feedback parameter associated therewith in response to multiple accesses thereto by a user.

12. A program product, comprising:

(a) a first program configured to, in response to a search request, generate a result set including identifications of a subset of a plurality of records in a database that match the search request, and to order the identifications of the records in the result set using a user feedback parameter associated with each record in the result set;

(b) a second program configured to, for each of the plurality of records, selectively update the user feedback parameter associated therewith in response to multiple accesses thereto by a user, and (c) a signal bearing medium bearing the first and second programs.

13. The program product of claim 12, wherein the signal bearing medium includes at least one of a recordable medium and a transmission type medium.

14. A method of accessing a database, the method comprising:

(a) in response to a search request, generating a result set including identifications of a subset of a plurality of records in a database that match the search request;

(b) ordering the identifications of the records in the result set using a user feedback parameter associated with each record in the result set, wherein ordering the identifications of the records in the result set using the user feedback parameter associated with each record in the result set includes:

(i) partitioning the result set into a plurality of relevance groups, with each relevance group including identifications of records having like relevancies to the search request; and (ii) sorting the identifications of records within each relevance group according to the user feedback parameter associated therewith; and (c) for each of the plurality of records in the database, selectively updating the user feedback parameter associated therewith in response to detecting that the record is the most recently accessed record in the result set.

15. The method of claim 14, wherein selectively updating the user feedback parameter includes increasing a weight for the user feedback parameter * associated with a first record in response to the first record being the most recently accessed record in the result set.

16. The method of claim 14, further comprising increasing a weight for the user feedback parameter associated with a first record in response to the number of times a user accesses the first record.

17. The method of claim 14, wherein the user feedback parameter associated with each record includes a plurality of weights, each weight associated with a keyword in the associated record, and wherein ordering the records in the result set using the user feedback parameter associated with each record in the result set includes ordering the records using any weight associated with a keyword matching the search request.

18. The method of claim 17, wherein selectively updating the user feedback parameter includes increasing a first weight for the user feedback parameter associated with a first record in response to receipt of a search request matching a first keyword associated with the first weight.

19. The method of claim 14, wherein generating the result set includes accessing a search request data structure that includes a plurality of search request records, each including a search request parameter identifying a unique combination of keywords, and a result set parameter identifying a subset of records in the database that match the unique combination of keywords.

20. The method of claim 14, wherein each record in the database includes a Uniform Resource Identifier (URL) that identifies a document stored on a computer network, wherein selectively updating the user feedback parameter includes selectively updating the user feedback parameter associated with a first record in the database in response to detecting that the document stored at the URL associated with the first record is the most recently accessed document identified in the result set.

21. The method of claim 20, wherein generating the result set includes generating at least one hypertext document including a plurality of hypertext links, each of which configured to access a document identified by a record in the result set.

22. The method of claim 21, wherein generating the hypertext document includes generating a script associated with at least one of the records in the result set, the script configured to generate a notification of when the associated record was accessed by a user, and wherein detecting that the document stored at the URL associated with the first record is the most recently accessed document identified in the result set includes receiving the notification.

23. An apparatus, comprising:

(a) a memory within which is resident a plurality of records from a database, each record associated with a user feedback parameter;

(b) a first program, resident in the memory, the first program configured to, in response to a search request, generate a result set including identifications of a subset of the plurality of records that match the search request, and to order the identifications of the records in the result set using the user feedback parameter associated with each record in the result set, wherein the first program is configured to order the identifications of the records in the result set using the user feedback parameter associated with each record in the result set by partitioning the result set into a plurality of relevance groups, with each relevance group including identifications of records having like relevancies to the search request and sorting the identifications of records within each relevance group according to the user feedback parameters associated therewith; and (c) a second program, resident in the memory, the second program configured to, for each of the plurality of records, selectively update the user feedback parameter associated therewith in response to detecting that the record is the most recently accessed record in the result set.

24. A program product, comprising:

(a) a first program configured to, in response to a search request, generate a result set including identifications of a subset of a plurality of records in a database that match the search request, and to order the identifications of the records in the result set using a user feedback parameter associated with each record in the result set, wherein the first program is configured to order the identifications of the records in the result set using the user feedback parameter associated with each record in the result set by partitioning the result set into a plurality of relevance groups, with each relevance group including identifications of records having like relevancies to the search request, and sorting the identifications of records within each relevance group according to the user feedback parameters associated therewith;

(b) a second program configured to, for each of the plurality of records, selectively update the user feedback parameter associated therewith in response to detecting that the record is the most recently accessed record in the result set; and (c) a signal bearing medium bearing the first and second programs.

25. The program product of claim 24, wherein the signal bearing medium includes at least one of a recordable medium and a transmission type medium.

26. A method of accessing a database, the method comprising:

(a) in response to a search request, generating a result set including identifications of a subset of a plurality of records in a database that match the search request;

(b) ordering the identifications of the records in the result set using a user feedback parameter associated with each record in the result set, each user feedback parameter including a plurality of weights, each weight associated with a keyword, wherein ordering the identifications of the records includes using only those weights associated with keywords that match the search request; and (c) for each of the plurality of records in the database, selectively updating at least one weight for the user feedback parameter associated therewith in response to user interaction with the record.

27. The method of claim 26, wherein selectively updating at least one weight for the user feedback parameter includes, in response to user interaction with a first record, increasing any weight associated with the first record that is further associated with a keyword matching an active search request for the user.

28. The method of clam 26, wherein selectively updating at least one weight for the user feedback parameter includes increasing a first weight for the user feedback parameter associated with a first record in response to detecting multiple accesses thereto by a user.

29. The method of claim 26, wherein selectively updating at least one weight for the user feedback parameter includes increasing a first weight for the user feedback parameter associated with a first record in response to the first record being the most recently accessed record in the result set.

30. The method of claim 26, wherein generating the result set includes accessing a search request data structure that includes a plurality of search request records, each including a search request parameter identifying a unique combination of keywords, and a result set parameter identifying a subset of records in the database that match the unique combination of keywords.

31. The method of claim 26, wherein ordering the identifications of the records in the result set using the user feedback parameter associated with each record in the result set includes:

(a) partitioning the result set into a plurality of relevance groups, with each relevance group including identifications of records having like relevancies to the search request; and (b) sorting the identifications of records within each relevance group using the weights from the user feedback parameters associated therewith.

32. The method of claim 26, wherein each record in the database includes a Uniform Resource Identifier (URL) that identifies a document stored on a computer network, wherein selectively updating the user feedback parameter includes selectively updating at least one weight for the user feedback parameter associated with a first record in the database in response to user interaction with the first record.

33. The method of claim 32, wherein generating the result set includes generating at least one hypertext document including a plurality of hypertext links, each of which configured to access a document identified by a record in the result set.

34. A method of processing search requests submitted to a search engine, the method comprising:

(a) receiving a search request that specifies a plurality of keywords;

(b) accessing a search request data structure in response to the search request, the search request data structure including a plurality of search request records, each search request record including a search request identifier identifying a unique combination of keywords, and a result set identifier identifying a subset of a plurality of records in a database that match the unique combination of keywords, wherein accessing the search request data structure includes searching the search request data structure to locate a search request record including a search request identifier that matches the plurality of keywords in the search request;

(c) generating a result set identifying the subset of records identified in the result set identifier in the located search request record;

(d) for each of the plurality of records in the database, selectively updating a user feedback parameter associated therewith in response to user interaction with the record; and (e) ordering the identifications of the subset of records in the result set using the user feedback parameter associated with each record in the result set; wherein the result set identifier for each search request record further includes a copy of the user feedback parameter for each of the subset of records identified thereby, and wherein selectively updating the user feedback parameter includes updating each copy of the user feedback parameter in the search request data structure.

35. The method of claim 34, wherein the result set identifier for each search request record further includes a list of record identifiers, each of which identifying a record in the associated subset of records, and each of which associated with the copy of the user feedback parameter for the associated record, the method further comprising ordering the list of record identifiers identified by the result set identifier of a first search request record based upon the copies of the user feedback parameters associated with the subset of records.

36. The method of claim 35, wherein the search request data structure comprises a table, wherein each search request record comprises an entry in the table, and wherein the result set identifier for each search request record comprises a linked list of record identifiers.

37. The method of claim 36, further comprising sorting the table entries responsive to frequency of access thereto.

38. The method of claim 37, further comprising:

(a) adding a new entry to the table in response to receiving a search request not matching any existing entry in the table; and (b) removing an entry from the table in response to a frequency of access therefor falling below a predetermined threshold.

39. An apparatus, comprising:

(a) a memory within which is resident a plurality of records from a database, each record associated with a user feedback parameter;

(b) a first program, resident in the memory, the first program configured to, in response to a search request, generate a result set including identifications of a subset of the plurality of records that match the search request, and to order the identifications of the records in the result set using the user feedback parameter associated with each record in the result set, wherein each user feedback parameter includes a plurality of weights, wherein each weight is associated with a keyword, and wherein the first program is configured to order the identifications of the records by using only those weights associated with keywords that match the search request; and (c) a second program, resident in the memory, the second program configured to, for each of the plurality of records, selectively update the user feedback parameter associated therewith in response to user interaction with the record.

40. A program product, comprising:

(a) a first program configured to, in response to a search request, generate a result set including identifications of a subset of a plurality of records in a database that match the search request, and to order the identifications of the records in the result set using a user feedback parameter associated with each record in the result set, wherein each user feedback parameter includes a plurality of weights, wherein each weight is associated with a keyword, and wherein the first program is configured to order the identifications of the records by using only those weights associated with keywords that match the search request;

(b) a second program configured to, for each of the plurality of records, selectively update the user feedback parameter associated therewith in response to user interaction with the record; and (c) a signal bearing medium bearing the first and second programs.

41. The program product of claim 40, wherein the signal bearing medium includes at least one of a recordable medium and a transmission type medium.

42. An apparatus, comprising:

(a) a memory within which is resident a search request data structure, the search request data structure including a plurality of search request records, each search request record including a search request identifier identifying a unique combination of keywords, and a result set identifier identifying a subset of a plurality of records in a database that match the unique combination of keywords;

(b) a program, resident in the memory, the program configured to, in response to a search request that specifies a plurality of keywords, search the search request data structure to locate a search request record including a search request identifier that matches the plurality of keywords in the search request, and to generate a result set identifying the subset of records identified in the result set identifier in the located search request record;

wherein the program is further configured to, for each of the plurality of records in the database, selectively update a user feedback parameter associated therewith in response to user interaction with the record; wherein the program is further configured to order the identifications of the subset of records in the result set using the user feedback parameter associated with each record in the result set; wherein the result set identifier for each search request record further includes a copy of the user feedback parameter for each of the subset of records identified thereby, and wherein the program is configured to selectively update the user feedback parameter by updating each copy of the user feedback parameter in the search request data structure.

43. A program product, comprising:

(a) a program configured to, in response to a search request that specifies a plurality of keywords, search a search request data structure to locate a search request record including a search request identifier that matches the plurality of keywords in the search request, the search request data structure including a plurality of search request records, each search request record including a search request identifier identifying a unique combination of keywords, and a result set identifier identifying a subset of a plurality of records in a database that match the unique combination of keywords, and the program further configured to generate a result set identifying the subset of records identified in the result set identifier in the located search request record; and (b) a signal bearing medium bearing the program;

wherein the program is further configured to, for each of the plurality of records in the database, selectively update a user feedback parameter associated therewith in response to user interaction with the record; wherein the program is further configured to order the identifications of the subset of records in the result set using the user feedback parameter associated with each record in the result set; wherein the result set identifier for each search request record further includes a copy of the user feedback parameter for each of the subset of records identified thereby, and wherein the program is configured to selectively update the user feedback parameter by updating each copy of the user feedback parameter in the search request data structure.

44. The program product of claim 43, wherein the signal bearing medium includes at least one of a recordable medium and a transmission type medium.

* * * * *